United States Patent [19]
Ribeiro Filho et al.

[11] Patent Number: 6,038,274
[45] Date of Patent: *Mar. 14, 2000

[54] APPARATUS FOR DECODING A CHANNEL SIGNAL INTO AN INFORMATION SIGNAL AND REPRODUCING ARRANGEMENT PROVIDED WITH THE APPARATUS

[75] Inventors: Milton de Andrade Ribeiro Filho, Sunnyvale, Calif.; Kornelis A. Schouhamer Immink, Eindhoven, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/730,689

[22] Filed: Oct. 11, 1996

[30]     Foreign Application Priority Data

Oct. 12, 1995  [EP]   European Pat. Off. ............... 95202750

[51] Int. Cl.⁷ ........................................................ H04L 7/00
[52] U.S. Cl. ............................................. 375/365; 370/503
[58] Field of Search ...................... 375/365, 260, 375/254, 285, 346, 366, 368; 370/503, 509; 714/789, 775

[56]              References Cited

U.S. PATENT DOCUMENTS

| | | |
|---|---|---|
| 4,380,069 | 4/1983 | Reitmeier et al. ..................... 371/31 |
| 4,620,311 | 10/1986 | Schouhamer Immink . |
| 5,148,330 | 9/1992 | Duurland et al. . |
| 5,243,470 | 9/1993 | Duurland et al. . |
| 5,365,604 | 11/1994 | Kwok et al. ............................. 382/54 |
| 5,371,634 | 12/1994 | Duurland et al. . |

FOREIGN PATENT DOCUMENTS

| | | |
|---|---|---|
| 0395205A2 | 10/1990 | European Pat. Off. . |
| 0655850A2 | 5/1995 | European Pat. Off. . |

*Primary Examiner*—Chi H. Pham
*Assistant Examiner*—Jean B Corrielus

[57]              ABSTRACT

An apparatus for decoding a channel signal into an information signal is disclosed. The channel signal comprises subsequent blocks of information, a block of information comprising a sync word and a plurality of channel words. The information signal includes subsequent information words. The apparatus includes an input terminal for receiving the channel signal, a conversion unit for converting the channel words into the information words, and an error concealment unit. The information signal obtained is supplied to an output terminal. The conversion unit includes a channel word detector for establishing whether channel words received are channel words not belonging to a group of valid channel words. If so, the channel word detector is adapted to supply a detection signal upon such detection. This enables the detection signals to be counted so as to establish a mis-synchronization of the decoding apparatus.

8 Claims, 2 Drawing Sheets

APPARATUS FOR DECODING A CHANNEL SIGNAL INTO AN INFORMATION SIGNAL AND REPRODUCING ARRANGEMENT PROVIDED WITH THE APPARATUS

BACKGROUND OF THE INVENTION

The invention relates to an apparatus for decoding a channel signal into an information signal, the channel signal comprising sequential blocks of information, a block of information comprising a sync word and a plurality of channel words, the information signal comprising sequential information words, the apparatus comprising input means for receiving the channel signal, conversion means for converting the channel words into the information words, output means for supplying the information signal. The invention also relates to an information reproducing arrangement which includes said decoding apparatus. A decoding apparatus as defined in the opening paragraph can be used in a reproducing arrangement for reproducing information from an optical or an magnetic record carrier or in a receiver for receiving information from a broadcast transmission channel. An apparatus of the type as defined above is known from U.S. Pat. No. 5,148,330, U.S. Pat. No. 5,243,470, and U.S. Pat. No. 5,371,634.

The conversion means may be in the form of an m-to-n decoder, in which m-bit channel words are converted into n-bit information words, where n and m are integers such that m is larger than n.

The decoding apparatus includes error concealment means which can comprise an error detection and correction unit, so that the locations of errors in the information words supplied by the conversion means can be established and the erroneous information words be corrected. Or, simply error concealment can be carried out, such as by muting, without any correction, or both.

During reception, errors can occur in the channel words received. If the number of errors appear to be too large, it is assumed that the decoder is not synchronized anymore, so that a resynchronization is started by detecting the sync words included in the channel signal. The sync word in a channel signal is generally a unique word, and its bitsequence is thus different from the channel words occurring in the channel signal.

The invention aims at providing an improved decoding apparatus. The apparatus in accordance with the invention is characterized in that the conversion means comprises channel word detection means for establishing whether channel words received do not belong to a group of valid channel words, the channel word detection means being adapted to supply a detection signal upon such detection.

The invention is based on the following recognition. Let us assume that the decoder apparatus is provided with conversion means for converting m-bit channel words into n-bit information words. Generally, there are $2^n$ information words, so that for n=8, 256 information words exist. For m=10, there are $2^{10}$ or 1020 possible channel words. For the conversion of the 256 information words, not all of the 1024 channel words are needed. One could argue that only 256 channel words are required, so that 1024–256 channel words are 'not real' channel words, or invalid channel words.

The apparatus, when synchronized, is able to locate the m-bit channel words in the channel signal received and can successfully decode them into n-bit information words.

It is not desirable that the decoder apparatus keeps searching for the sync word all the time in the channel signal, as errors in the channel signal can generate a false sync pattern detection, which results in a loss of synchronization. Hence, the decoder apparatus should only search for sync words when it is not synchronized (out of lock).

If the decoder apparatus is out of lock, it is not able to find correctly the boundaries of the channel words in the channel signal. In this situation, the decoder will give two sort of results:

(i) an erasure indicating that the m-bit channel word is not a valid channel word, (ii) an n-bit information word.

In an ideal situation for synchronization, a mis-synchronization would mean that the decoder apparatus would only be able to find erasures (invalid channel words), hence, a sequence of invalid channel words would certainly mean a mis-synchronization. However, channel codes are usually not specifically designed for implementation of mis-synchronization detectors.

There is a probability P that a decoder apparatus that is out of lock will detect an erasure. In general it can be stated that, for larger bitshifts, the probability will be higher.

In accordance with the invention, an early indication of an out of lock situation can be obtained by detecting invalid channel words. In dependence on the number of invalid channel words detected in a specified time interval, it is decided whether a mis-synchronization situation is present or not. More specifically, the number of invalid channel words present in the last F channel words received is counted. If the number exceeds a specified threshold value (K), it is decided that a mis-synchronization situation exists, so that the sync word detector can be enabled to search for a sync word.

The choice of the adequate values for F and K for the detection of a mis-synchronization situation is a function of the probability P and of the bit error rate SER (being the symbol error rate considering the decoder apparatus being in synchronization). F and K should be large enough to guarantee that the probability of having a detection caused by substitution error is very small.

BRIEF DESCRIPTION OF THE DRAWINGS

These and other aspects of the invention will be further explained in conjunction with the following drawings 5, in which.

DESCRIPTION OF THE PREFERRED EMBODIMENTS

Figure 1:
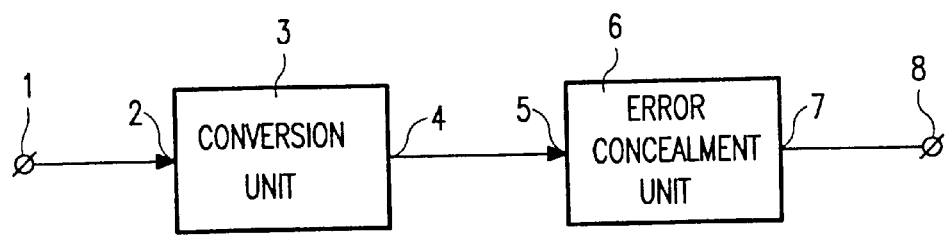
FIG. 1 shows an embodiment of the decoder apparatus in accordance with the invention, FIG. 2 an example of the channel signal supplied to the decoder apparatus, FIG. 3 an embodiment of the conversion unit included in the apparatus of FIG. 1.
Figure 2:
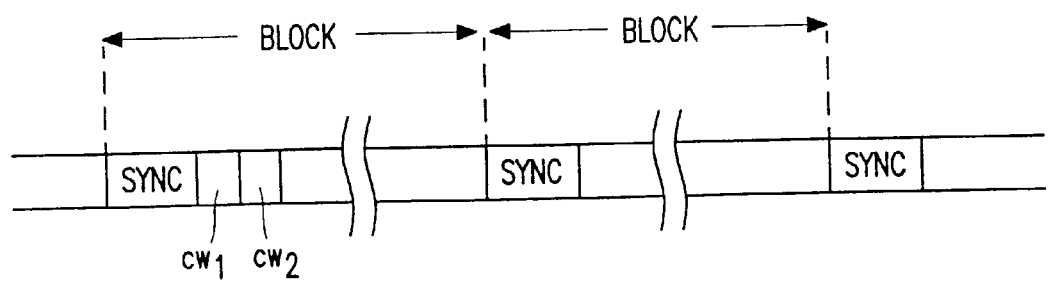

FIG. 1 shows an embodiment of the decoder apparatus having an input terminal 1 for receiving the channel signal. The terminal 1 is coupled to an input 2 of a conversion unit 3, which has an output 4 coupled to an input 5 of an error concealment unit 6, which has an output 7 coupled to an output terminal 8 of the decoding apparatus. The channel signal supplied to the input terminal 1 is schematically shown in FIG. 2. The channel signal comprises successive blocks of data. Each block comprises a sync word and a plurality of channel words $cw_1$, $cw_2$, . . . .

In the present embodiment, the channel words have m-bits, where for example m can be 10. The conversion unit 3 is adapted to convert the channel words into information words. In the present embodiment, the conversion unit 3 converts the m-bit channel words into n-bit information words, where for example n can be 8. such m-to n converters are well known in the art. Reference is made in this respect to U.S. Pat. No. 4,620,311.

The n-bit information words are supplied to the unit 6, in which any error concealment or error correction is carried out on the sequence of information words. As a result, concealed and/or corrected information word appear at the output 7. The concealment unit 6 will not be discussed any further, as the invention does not reside in the concealment unit 6.

Figure 3:
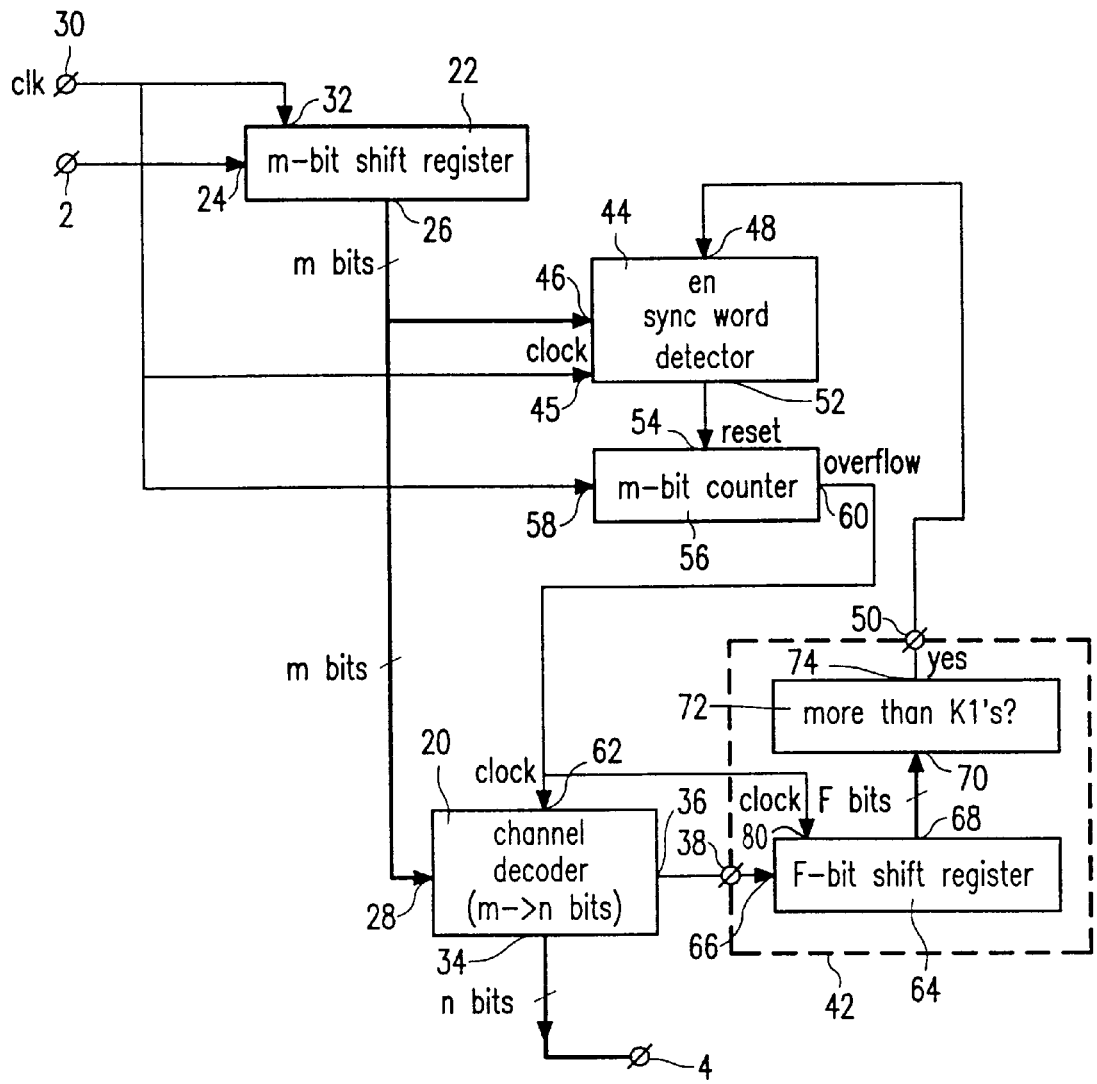

An embodiment of the conversion unit 3 is further shown in FIG. 3. The conversion unit 3 comprises a channel decoder 20 for converting the m-bit channel words into n-bit information words. The input 2 of the conversion unit 3 is coupled to an input 24 of a serial-parallel converter 22 which is in the form of an m-bit shift register. This shift register converts the serial datastream of the channel signal into sequential channel words of m bits, under the influence of a clock signal clk applied via an input 30 to the clock input 32 of the shift register, and supplies the m-bit channel words to an output 26. The output 26 of the serial-parallel converter 22 is coupled to an input 28 of the channel decoder 20. The clock signal clk supplied to the input 30 may have been derived from the channel signal itself using a PLL.

n-bit information words are generated by the decoder 20 from the received m-bit channel words. The n-bit information words obtained are supplied at an output 34 of the decoder. Which is coupled to the output 4 of the conversion unit 3. If required, a parallel-serial converter (not shown) can be included in which a parallel-to-serial conversion is carried out on the n-bit information words.

The decoder 20 has a further output 36 for supplying an error detection signal, which signal is supplied to an input 38 of a mis sync detector unit 42.

A sync word detector 44 is present having an input 46 coupled to the output 26 of the converter 22, having an enable input 48 coupled to an output 50 of the detector unit 42 and having a clock signal input 45 coupled to the input 30.

The detector unit 42 is adapted to count the number of error detection signals supplied by the decoder 20 to the input 38. In response to the receipt of a specified number of such signals, to be discussed later, the detector 42 generates a control signal at its output 50. This control signal functions as an enable signal for the sync word detector 44, so that this sync word detector 44 is enabled upon the receipt of a control signal received via its input 48. Upon detection of a sync word by the sync word detector 44, it generates a reset signal at its output 52. This output 52 is coupled to a reset input 54 of an m-bit counter 56. The count input 58 of the counter 56 is coupled to the input 30. An overflow output 60 of the counter 56 is coupled to a clock signal input 62 of the decoder 20.

The mis sync detector 42 is adapted to generate a control signal at its output 50 in response to the receipt of error signals received at its input 38. More specifically, it generates a control signal upon the receipt of at least K error signals within F subsequently decoded information words. To that purpose, the detector 42 comprises a counter in the form of an F-bit shift register 64, which has its input 66 coupled to the input 38 of the mis sync detector 42 and an output 68 which is coupled to an input 70 of detector 72, which is a comparator. An output 74 of the comparator 72 is coupled to the output 50 of the mis sync detector 42.

The conversion unit of FIG. 3 functions as follows. In response to the clock signal clk applied to the input 32 of the shift register 22, the serial data of the channel signal applied to the input 2 is shifted into the shift register 22. Further, the counter 56 counts up in response to receiving the clock signal clk. We assume that the conversion unit 3 is in synchronization. This means that the sync word detector 44 is disabled. The counter 56 counts m clock pulses and subsequently supplies an overflow signal at its output 60 after having counted m clock pulses. The overflow signal is supplied to the clock input 62 of the decoder 20. At this instant, an m-bit channel word is present on the m signal lines between the output 26 of the shift register 22 and the input 28 of the decoder 20. The decoder converts the m-bit channel word into an n-bit information word and supplies the information word to its output 34.

As has been said earlier, $2^m$ channel words are possible, of which only a limited number are needed for the conversion of the n-bit information words. As a consequence, there are many m-bit channel words (the so-called invalid channel words) that are not used for the conversion of the information words and therefore should not appear in the channel signal. Because of mis-synchronisation, however, such invalid channel words may occur in the channel words applied to the decoder 20. The decoder 20 is capable of establishing whether a channel word received is one of the valid channel words, or is an invalid channel word. In the latter case, the decoder 20 will generate a logic 'one' value at its output 36 as an error signal. As the overflow signal generated at the output 60 of the counter 56 is also supplied to a clock input 80 of the shift register 64, this overflow signal results in a '1' being shifted into the first position of the shift register 64.

In this situation, the decoder 20 will not generate an information word at its output 34, or will generate an information word that is the closest to one of the information words, given an invalid channel word.

During the next m pulses in the clock signal clk applied to the input 30, m subsequent bits of the channel signal, applied to the input 2, are shifted into the shift register 22. Upon the m-th clock pulse, the counter 56 again generates an overflow signal at its output 60. The overflow signal triggers the decoder 20 to convert the next m-bit channel word into an n-bit information word. If the m-bit channel word is a valid channel word, the output 36 remains 'low'. As a result a '0' bit is shifted into the shift register 64, upon the receipt of the overflow signal at the input 80. If the m-bit channel word appears to be an invalid channel word, the output 36 is 'high', so that a '1' bit is shifted into the shift register 64.

This continues for subsequent channel words in the serial datastream of the channel signal applied to the input 2. The F bit positions in the shift register 64 have all outputs that form the output 68 of the shift register 64. The detector 72 can establish whether more than K '1' bits are stored in the F bit positions of the shift register 64. If, so, it is concluded that the decoder is in mis-synchronization. As a result, a control signal is generated at the output 50. In response to receiving this control signal, the sync word detector 44 is enabled and starts searching for a sync word. Upon detection of a sync word, the detector 44 generates a detection signal at its output 52. This signal functions as a reset signal for the counter 56. As a consequence, the counter 56 is reset to 'zero', so that a quick resynchronization has been realized.

Figure 4:
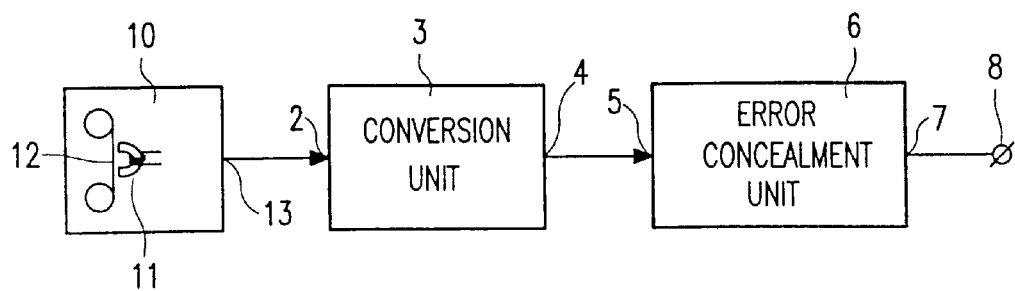
FIG. 4 shows a reproducing arrangement provided with the apparatus.

FIG. 4 shows schematically a block diagram of a reproducing arrangement provided with the decoding apparatus in accordance with the invention. The reproducing arrangement comprises read means 10 for reading a channel signal from a track on a record carrier 12. The read means 10 in this embodiment are adapted to read a channel signal from a magnetic record carrier 12 and comprises at least one read head 11. The read means supply the channel signal to an output 13, which is coupled to the input 2 of the conversion unit 3. The conversion unit 3 is the same and functions the same as the conversion unit 3 of FIG. 1. Therefore, no further explanation is needed. The output 4 of the conversion unit 3 is coupled to the input 5 of the error concealment unit 6, as in FIG. 1.

It should be noted that the invention results in an early detection of a mis-synchronization. Further, whilst the present invention has been described with respect to preferred embodiments thereof, it is to be understood that these are not limitative examples. Thus, various embodiments thereof may become apparent to those skilled in the art, without departing from the scope of the invention, as defined in the appended claims.

We claim:

1. Apparatus for decoding a channel signal to recover an information signal, comprising:

input means for receiving the channel signal;

conversion means for decoding m-bit channel words in the channel signal into corresponding n-bit information words in the information signal, where m>n, whereby besides valid channel words which correspond to information words there are possible invalid channel words which do not correspond to information words and which result in errors in the information signal, the conversion means being adapted for generating an error signal whenever a received channel word is invalid;

means for counting the number of error signals occurring during decoding of a selected number of channel words and producing a control signal whenever the number of error signals exceeds a predetermined value indicative of loss of sync with the channel words; and sync word detecting means actuated by said control signal to detect synch words in the channel signal, and upon detection of a synch word providing a detection signal which synchronizes said conversion means to continue decoding the channel words.

2. Apparatus as claimed in claim 1, further comprising error concealment means for concealing errors in the information signal produced by said conversion means.

3. Apparatus as claimed in claim 2, wherein said error concealment means comprises means for detecting and correcting errors in the information words produced by said conversion means.

4. Apparatus for reproducing an information signal from a record carrier on which a channel signal encoded from the information signal has been recorded; comprising:

means for reading the channel signal from a track on the record carrier; and apparatus as claimed in claim 1 for decoding the channel signal to recover the information signal therefrom.

5. A method comprising:

receiving a channel signal;

decoding m-bit channel words in the channel signal into corresponding n-bit information words in an information signal, where m>n, whereby besides valid channel words which correspond to information words there are possible invalid channel words which do not correspond to information words and which result in errors in the information signal;

generating an error signal whenever a channel word is invalid;

counting the number of error signals occurring during decoding of a selected number of received channel words;

producing a control signal whenever the number of error signals exceeds a predetermined value indicative of loss of sync with the channel words;

detecting a sync word in the channel signal in response to the control signal; and synchronizing the decoding in response to the detection of the sync word.

6. The method of claim 5 further comprising the step of concealing errors in the information signal.

7. The method of claim 6 in which the step of concealing errors includes detecting and correcting the errors in the information words.

8. A method, comprising:

reading a channel signal from a track on a record carrier;

decoding m-bit channel words in the channel signal into corresponding n-bit information words in an information signal, where m>n, whereby besides valid channel words which correspond to information words there are possible invalid channel words which do not correspond to information words and which result in errors in the information signal;

generating an error signal whenever a channel word is invalid;

counting the number of error signals occurring during decoding of a selected number of received channel words;

producing a control signal whenever the number of error signals exceeds a predetermined value indicative of loss of sync with the channel words;

detecting a sync word in the channel signal in response to the control signal; and synchronizing the decoding in response to the detection of the sync word.

* * * * *